United States Patent
Chen

(10) Patent No.: US 12,393,053 B2
(45) Date of Patent: Aug. 19, 2025

(54) DETACHABLE HINGE

(71) Applicant: Hwa Meei Optical Co., Ltd., Tainan (TW)

(72) Inventor: Chih-Ming Chen, Tainan (TW)

(*) Notice: Subject to any disclaimer, the term of this patent is extended or adjusted under 35 U.S.C. 154(b) by 0 days.

(21) Appl. No.: 18/510,717

(22) Filed: Nov. 16, 2023

(65) Prior Publication Data
US 2025/0116883 A1  Apr. 10, 2025

(30) Foreign Application Priority Data

Oct. 6, 2023  (TW) .................................. 112210862

(51) Int. Cl.
*G02C 5/22* (2006.01)
(52) U.S. Cl.
CPC .................................. *G02C 5/2209* (2013.01)
(58) Field of Classification Search
CPC ...... G02C 5/22; G02C 5/2209; G02C 5/2245; G02C 5/2218
See application file for complete search history.

(56) References Cited

U.S. PATENT DOCUMENTS

| | | | | |
|---|---|---|---|---|
| 1,478,661 A * | 12/1923 | Gage | ........................ | G02C 5/22 351/99 |
| 2,169,235 A * | 8/1939 | Foster | ...................... | G02C 5/22 351/116 |
| 2,504,157 A * | 4/1950 | Rosenheim | .......... | G02C 5/2209 351/44 |
| 2,671,379 A * | 3/1954 | Eloranta | .................. | G02C 5/22 351/111 |
| 7,543,931 B2 * | 6/2009 | Proksch | .................... | G02C 1/08 351/113 |
| 2009/0279047 A1 * | 11/2009 | Tsai | ......................... | G02C 1/08 351/153 |
| 2009/0284710 A1 * | 11/2009 | Montagner | .......... | G02C 5/2245 351/153 |
| 2011/0317123 A1 * | 12/2011 | Li | ............................ | G02C 5/10 351/140 |
| 2013/0128220 A1 * | 5/2013 | Chen | ...................... | G02C 5/146 351/121 |
| 2017/0227787 A1 * | 8/2017 | Chen | ..................... | G02C 5/2209 |
| 2017/0322428 A1 * | 11/2017 | Da Col | ................. | G02C 5/2281 |

\* cited by examiner

*Primary Examiner* — Emily M Morgan
(74) *Attorney, Agent, or Firm* — Bruce Stone LLP; Joseph A. Bruce

(57) ABSTRACT

Provided is a detachable hinge, including a frame and two temples. Each side of the frame is provided with a pivot base having a window. A pivot joint is provided between a top surface and a bottom surface of the window. A front end of each temple is provided with a combination bracket. The combination bracket is provided with a pivot hole having an aperture from top to bottom. The aperture has a width that is smaller than an outer diameter of the pivot joint. Each temple is detachably forced into the pivot joint from the inside of the frame by the aperture such that the pivot joint is embedded in the pivot hole and can pivot relative to the frame. This allows the operator to disassemble and assemble the frame or temples without the assistance of tools, thereby improving the convenience of structural disassembly and assembly.

4 Claims, 16 Drawing Sheets

DETACHABLE HINGE

BACKGROUND OF THE INVENTION

1. Field of the Invention

The present disclosure relates an eyeglasses hinge, and particularly a structure that is screw-free and can be disassembled and replaced by oneself.

2. The Prior Arts

According to the structures of commercially available eyeglasses, these structures mainly include a frame and two temples. The assembly structure of the frame and the temples is mainly provided with a pivot hole on both sides of the temple and a pivot hole on the front end of each of the temples, which are then screwed by a screw such that each of the temples can be pivoted, folded or unfolded relative to the frame.

However, since the screws used in eyeglasses are relatively small, specific tools are required to assemble or disassemble these screws. When the frame or temples are damaged or need to be disassembled to replace the frame or temples with a different shape, the screws are also easily to be accidentally lost. In addition, after long-term use of eyeglasses, the screws are easy to loosen. If the screws are not tightened immediately, the screws may easily fall off, thereby causing the frame and temples to separate and causing inconvenience to the wearer.

SUMMARY OF THE INVENTION

In view of the shortcomings and deficiencies of the prior art, the present disclosure provides a detachable hinge structure that is screw-free and does not require tool to assist in disassembly.

In order to achieve the above purpose, the present disclosure provides a detachable hinge, comprising: a frame, having a pivot base on each side and a window passing through an inner side and an outer side of the pivot base, wherein a pivot joint is provided between a top surface and a bottom surface of the window; and two temples, wherein two ends of each temple are respectively provided with an ear hook part and a combination bracket, the combination bracket is provided with a pivot hole having an aperture from top to bottom, the aperture is located on the front side of the combination bracket, the aperture has a width that is smaller than the outer diameter of the pivot joint, and each temple is detachably forced into the pivot joint from the inner side of the frame by the aperture such that the pivot joint is embedded in the pivot hole, thereby pivoting relative to the frame.

As such, when the temples are to be detached, the temples are just pushed in the opposite direction of the frame such that the pivot joint of the frame is forced out of the aperture in the combination bracket, and the frame and the temples can be separated. Hence, the operator can disassemble and assemble the frame and temples without the assistance of tools, thereby improving the convenience of structural disassembly and assembly, reducing the manufacturing process at the factory and shortening the production cycle.

DETAILED DESCRIPTION OF THE PREFERRED EMBODIMENT

The following is a specific embodiment to illustrate the implementation of the present disclosure. Persons skilled in the art can easily understand the other advantages and effects of the present disclosure from the disclosure in the specification.

Figure 1:
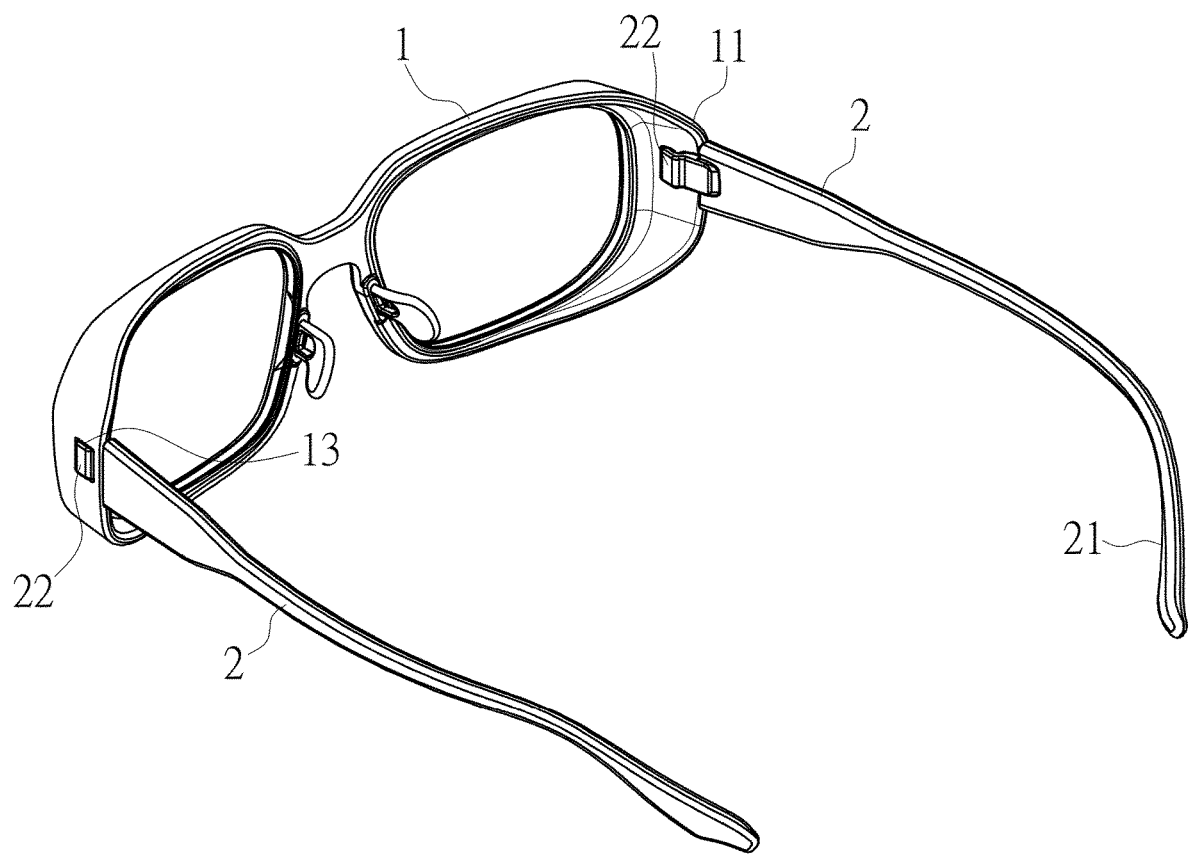
FIG. 1 is a three-dimensional schematic diagram showing a detachable hinge according to one embodiment of the present disclosure.
Figure 2:
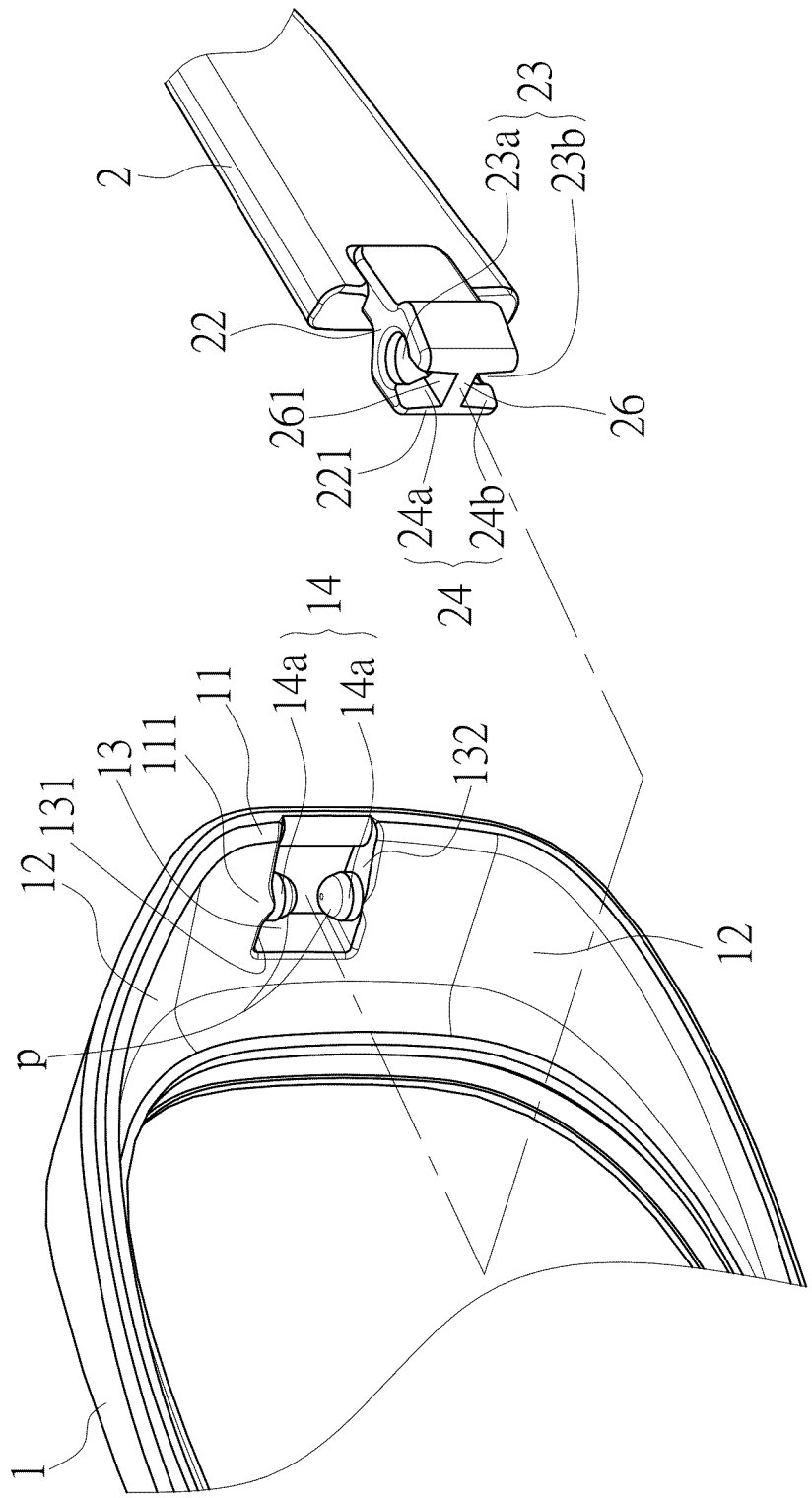
FIG. 2 is a partially exploded schematic diagram showing the detachable hinge of the present disclosure.
Figure 3:
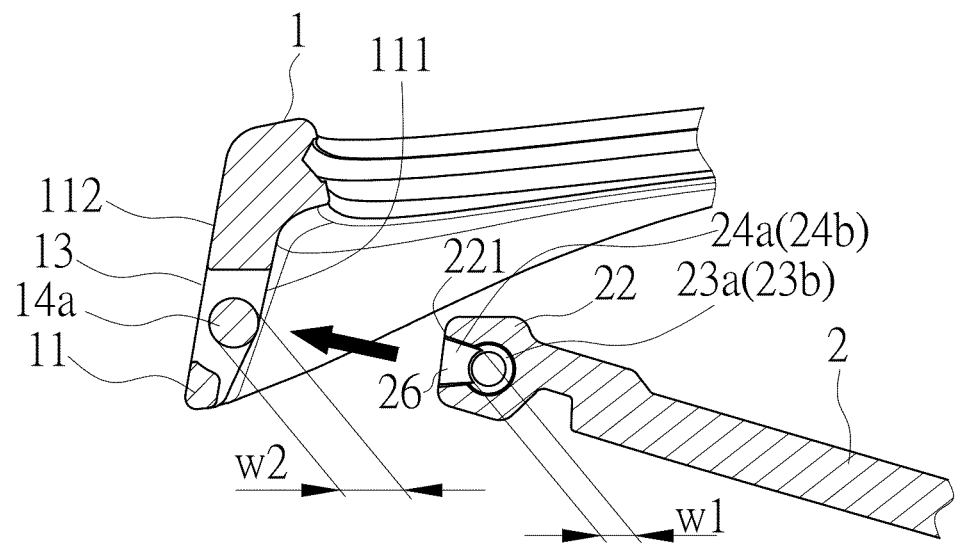
FIG. 3 and FIG. 4 are cross-sectional schematic diagrams of the continuous assembly of the detachable hinge according to the present disclosure.

Referring to FIG. 1 to FIG. 3, a detachable hinge mainly includes a frame 1 and two temples 2. The temples 2 are detachably pivotally connected to both sides of the frame 1.

The frame 1 is provided with a pivot base 11 on each side. In an embodiment, the pivot base 11 extends backward from both sides of the frame 1. The top and bottom of the pivot base 11 respectively extend a shielding part 12 along the shape of the frame 1 to bring about a protective effect on the sides of eyes. The frame 1 is provided with a window 13 penetrating the inner side 111 and the outer side 112 of the pivot base 11. The window 13 is in the shape of a quadrilateral, but not limited thereto. The window 13 may also be other geometric shapes such as a polygon or a circle. A pivot joint 14 is provided between the top surface 131 and the bottom surface 132 of the window 13. In an embodiment, the pivot joint 14 may be two columns 14a. The columns 14a extend from the top surface 131 and the bottom surface 132 of the window 13, respectively, and two columns 14a are coaxially spaced and opposite to each other. The pivot joint 14 is preferably located at the center of the window 13, and preset spaces are left on both sides of the pivot joint 14 and both sides of the window 13 for assembly of the temple 2.

Two ends of each temple 2 are respectively provided with an ear hook part 21 and a combination bracket 22. The combination bracket 22 extends from one end of the temple 2. The combination bracket 22 is provided with a pivot hole 23 running from top to bottom, and the pivot hole 23 has an aperture 24. In an embodiment, the aperture 24 is located on the front side 221 of the combination bracket 22, but not limited thereto. Additionally, the aperture 24 has a width w1 that is smaller than a width w2 of the two columns 14*a* of the pivot joint 14.

Figure 6:
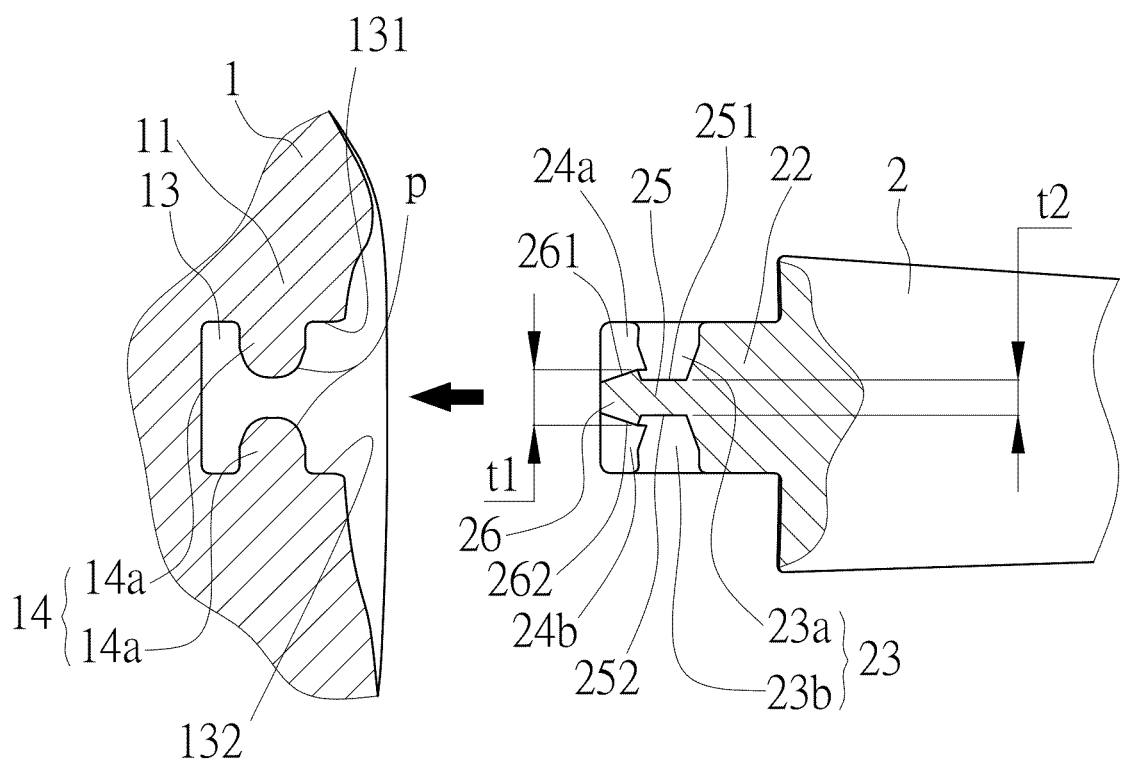
FIG. 6 and FIG. 7 are longitudinal-sectional schematic diagrams showing the continuous operation of assembly according to the present disclosure.
Figure 7:
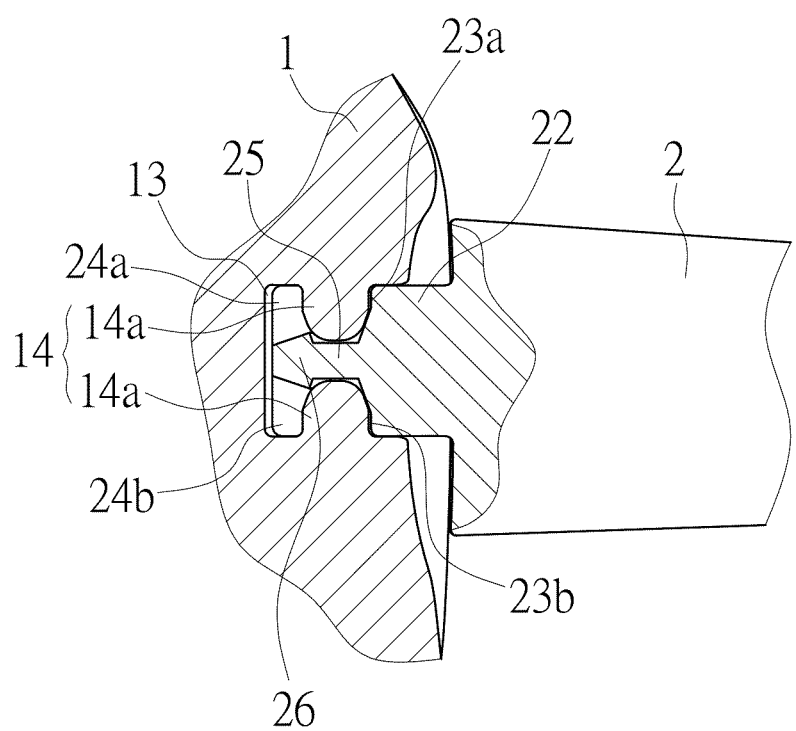

Moreover, referring to FIG. 2, FIG. 6 and FIG. 7, a partition 25 is provided in the middle section of each pivot hole 23 to divide the pivot hole 23 into an upper pivot hole 23*a* and a lower pivot hole 23*b*. A stop part 26 provided in the middle of the aperture 24 is connected to the partition part 25 to separate the aperture 24 into an upper aperture 24*a* and a lower aperture 24*b*. The top surface 261 and the bottom surface 262 of the stop part 26 respectively form slopes with tapering angles from the front side 221 of the combination bracket 22 toward the direction of the pivot hole 23 such that the thickness t1 of the stop part 26 connected to the partition part 25 is greater than the thickness t2 of the partition part 25, thereby forming a height difference between the top surface 251 of the partition part 25 and the stop part 26 and between the bottom surface 252 of the partition part 25 and the stop part 26, but not limited thereto. The stop part 26 may also be flush with the partition part 25. In addition, the front end p of each column 14*a* of the pivot joint 14 is tapered. The tapered shape in the drawings is illustrated by an inclined surface and a curved surface, but not limited thereto. The shape of each of the upper pivot hole 23*a* and the lower pivot hole 23*b* matches a shape of each column 14*a* of the pivot joint 14.

Referring to FIG. 2 to FIG. 7, when the temples 2 are to be assembled to the frame 1, the upper aperture 24*a* and the lower aperture 24*b* of the temples 2 are elastically forced into the two columns 14*a* of pivot joint 14 from the inside of the frame 1 such that the two columns 14*a* are embedded in the upper pivot hole 23*a* and the lower pivot hole 23*b*. The stop part 26 is an inclined surface that gradually expands at an angle. Hence, when the front end of the stop part 26 is inserted into the space between the two columns 14*a* of the pivot joint 14, the two columns 14*a* will elastically deform along with the top surface 161 and the bottom surface 262 of the stop part 26. When the two columns 14*a* are inserted into the upper pivot hole 23*a* and the lower pivot hole 23*b*, the height difference between the stop part 26 and the partition 25 also brings about a blocking effect. Besides, the periphery of the two columns 14*a* of the pivot joint 14 is covered by the upper pivot hole 23*a* and the lower pivot hole 23*b*, and will not easily break away from the upper pivot hole 23*a* and the lower pivot hole 23*b*.

When the temples are to be detached, it is only necessary to apply forces on the temples 2 in the opposite direction of the frame 1 such that the two columns 14*a* of the pivot joint 14 are forced out from the upper aperture 24*a* and the lower aperture 24*b* of the combination bracket 22, and the frame 1 is separated from the temples 2. It is worth mentioning that since the front end p of each of the two columns 14*a* is tapered, the friction between the two columns 14*a* and the temples 2 can be reduced when the two columns 14*a* are forced in or out.

Figure 4:
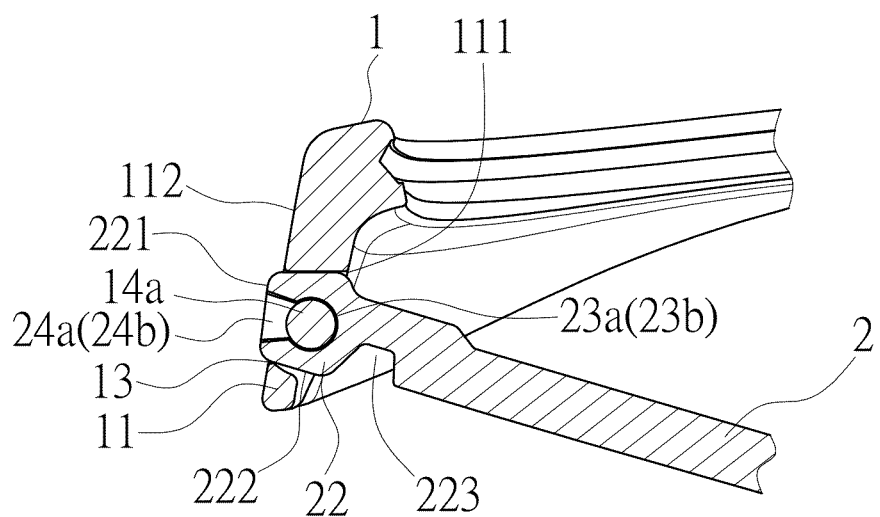
Figure 5:
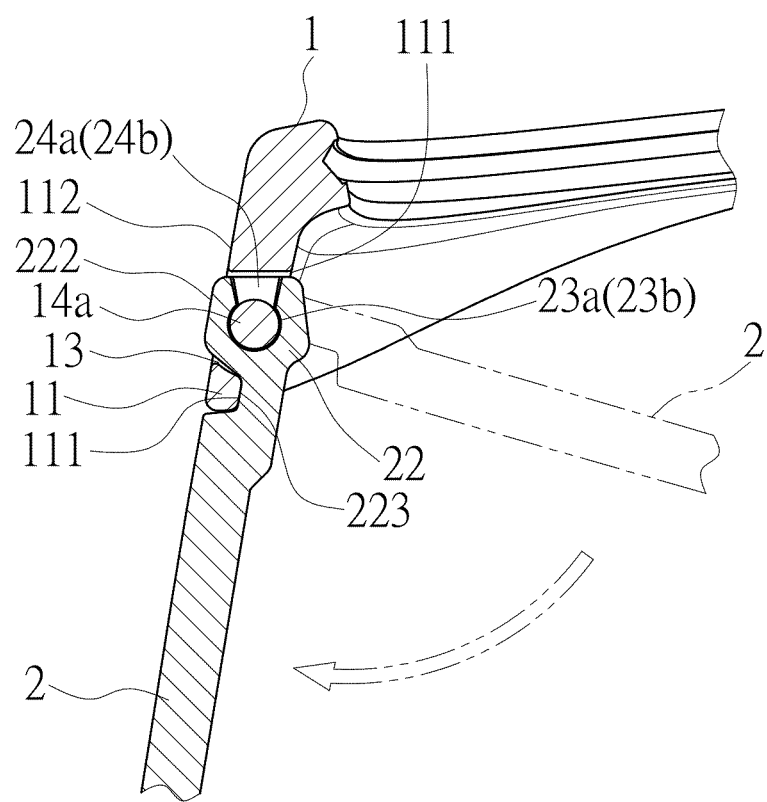
FIG. 5 is a schematic diagram showing the temple unfolded according to the present disclosure.

As mentioned above, when each of the temples 2 is unfolded, the outer side 222 of the combination bracket 22 is against the inner side 111 of the pivot base 11. In an embodiment, the outer side 222 of the combination bracket 22 is provided with a groove 223, and the inner side 111 of the pivot base 11 is partially pressed against the groove 223, as shown in FIG. 5. The outer side 222 and the front side 221 of the combination bracket match the shape of the window 13. As such, when the temples 2 are unfolded, the outer side 222 of the combination bracket 22 is embedded in the window 13. As shown in FIG. 4, when the temples 2 are folded, the outer side 222 of the combination bracket 22 pivots away from the window 13, and the front side 221 is embedded in the window 13 as the temples 2 pivot.

Figure 8:
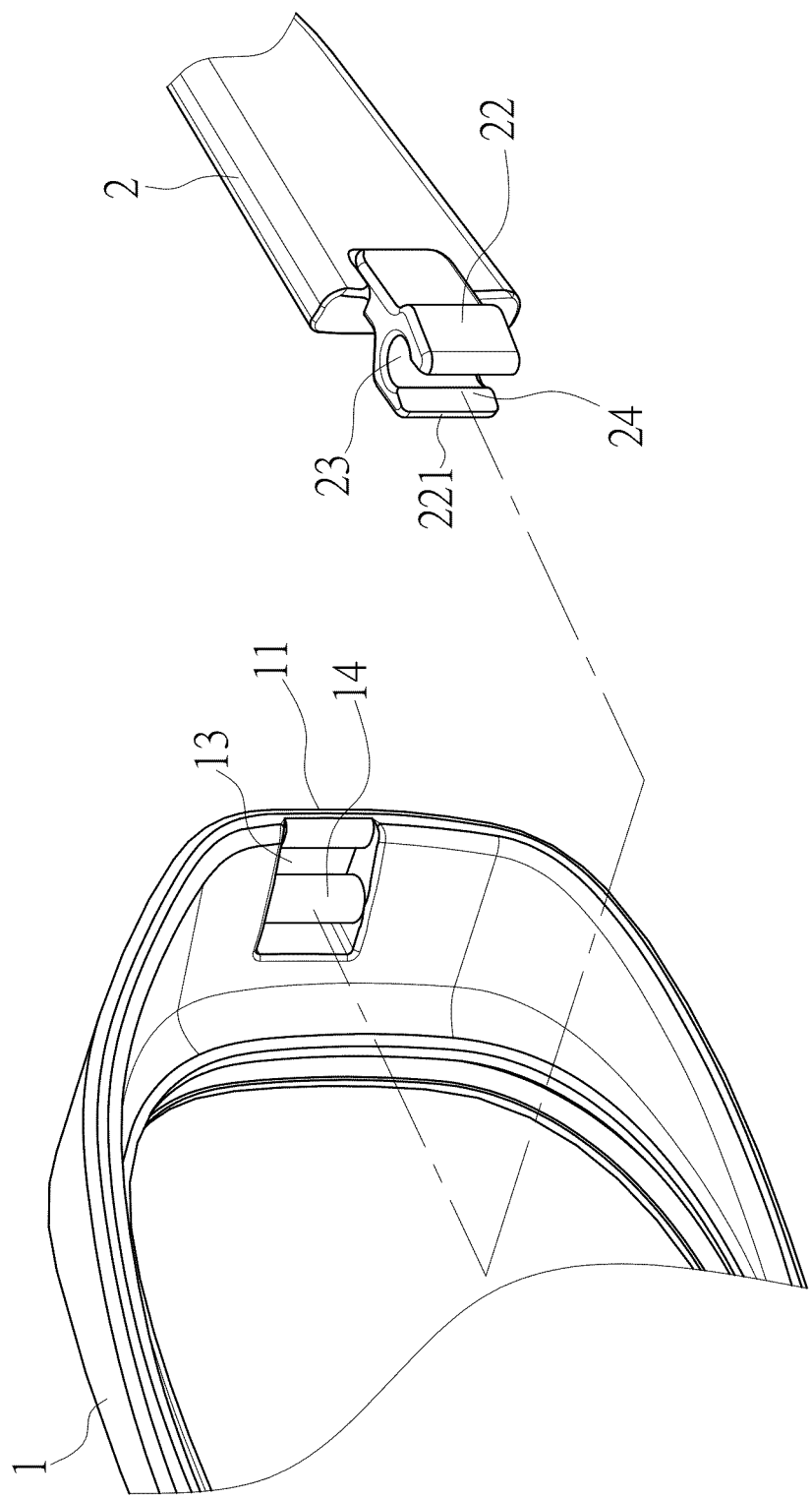
FIG. 8 is a schematic diagram showing a detachable hinge according to one embodiment of the present disclosure.
Figure 9:
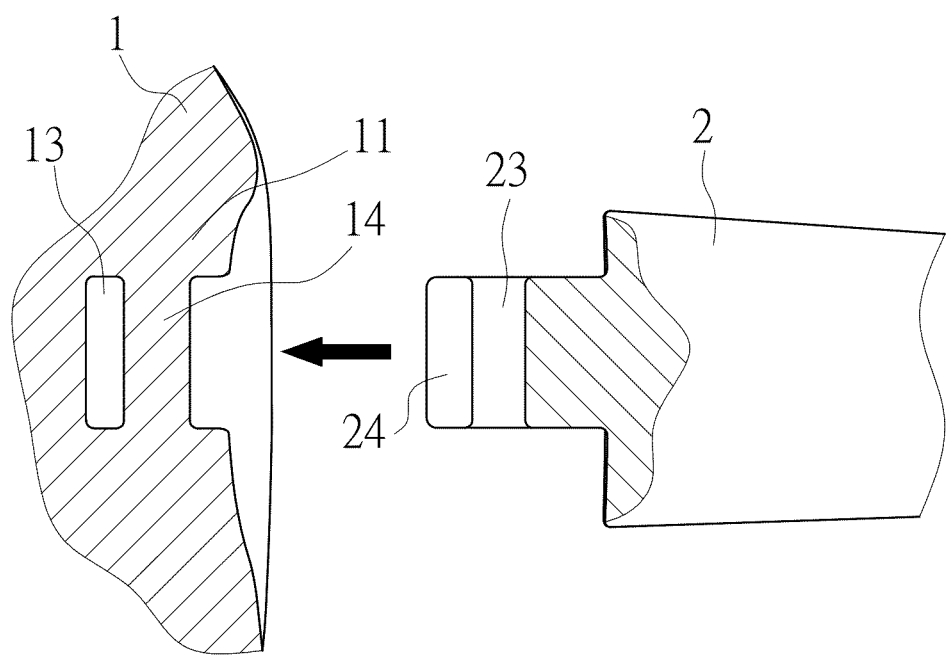
FIG. 9 is a cross-sectional schematic diagram of the detachable hinge according to one embodiment of the present disclosure.
Figure 10:
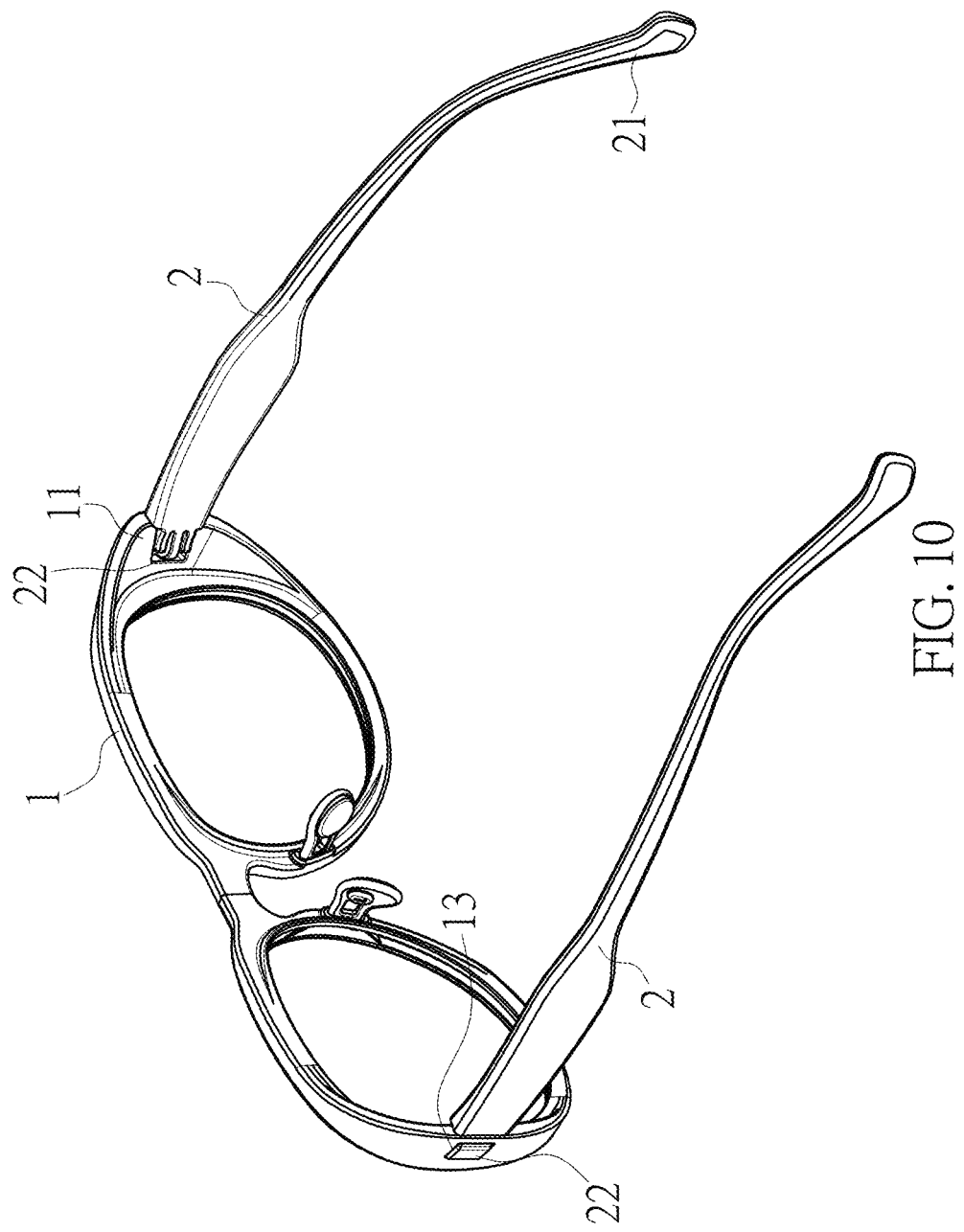
FIG. 10 is a three-dimensional schematic diagram showing the detachable hinge according to another embodiment of the present disclosure.
Figure 11:
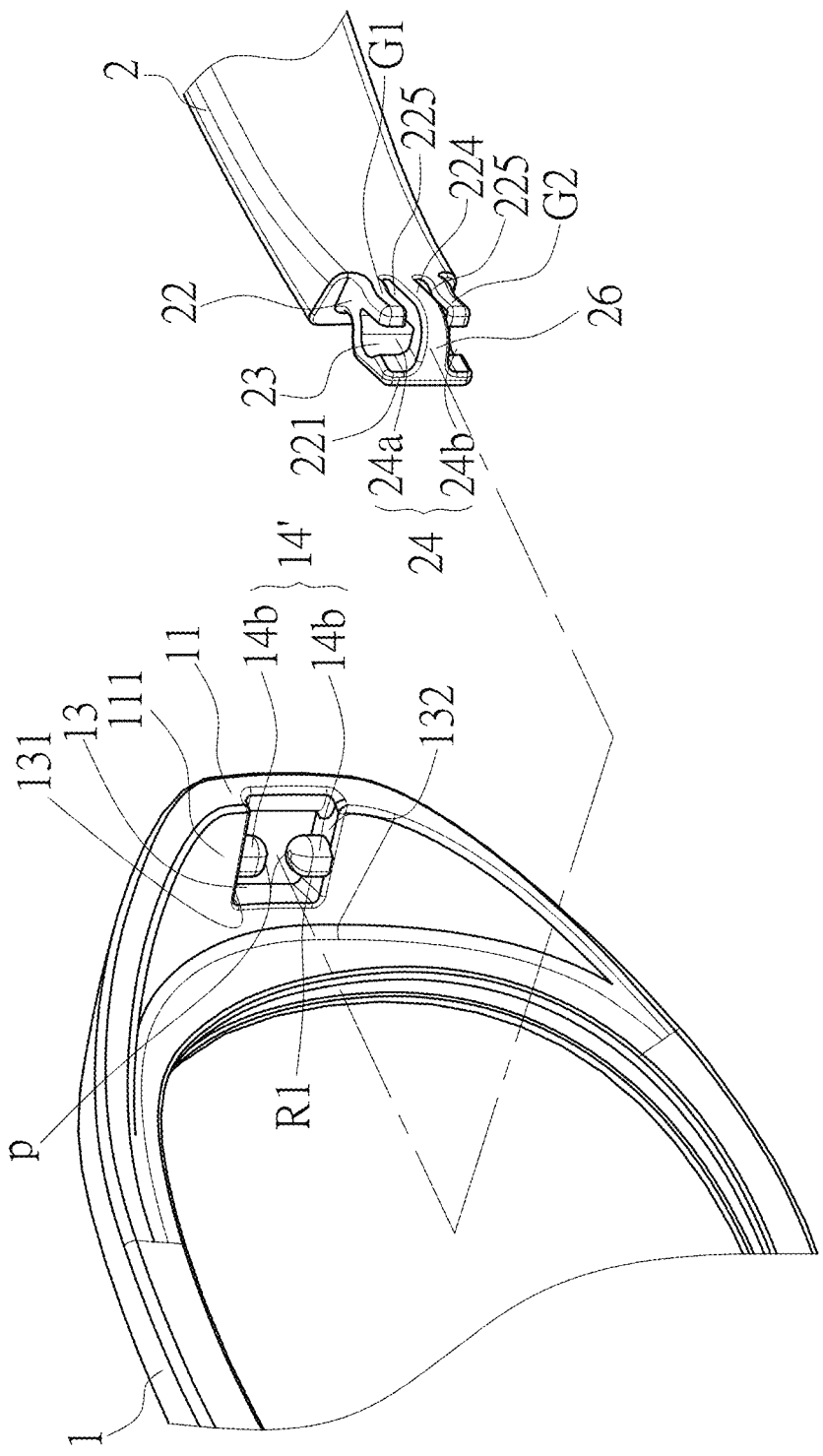
FIG. 11 is a partially exploded schematic diagram showing the detachable hinge of FIG. 10 according to the present disclosure.
Figure 12:
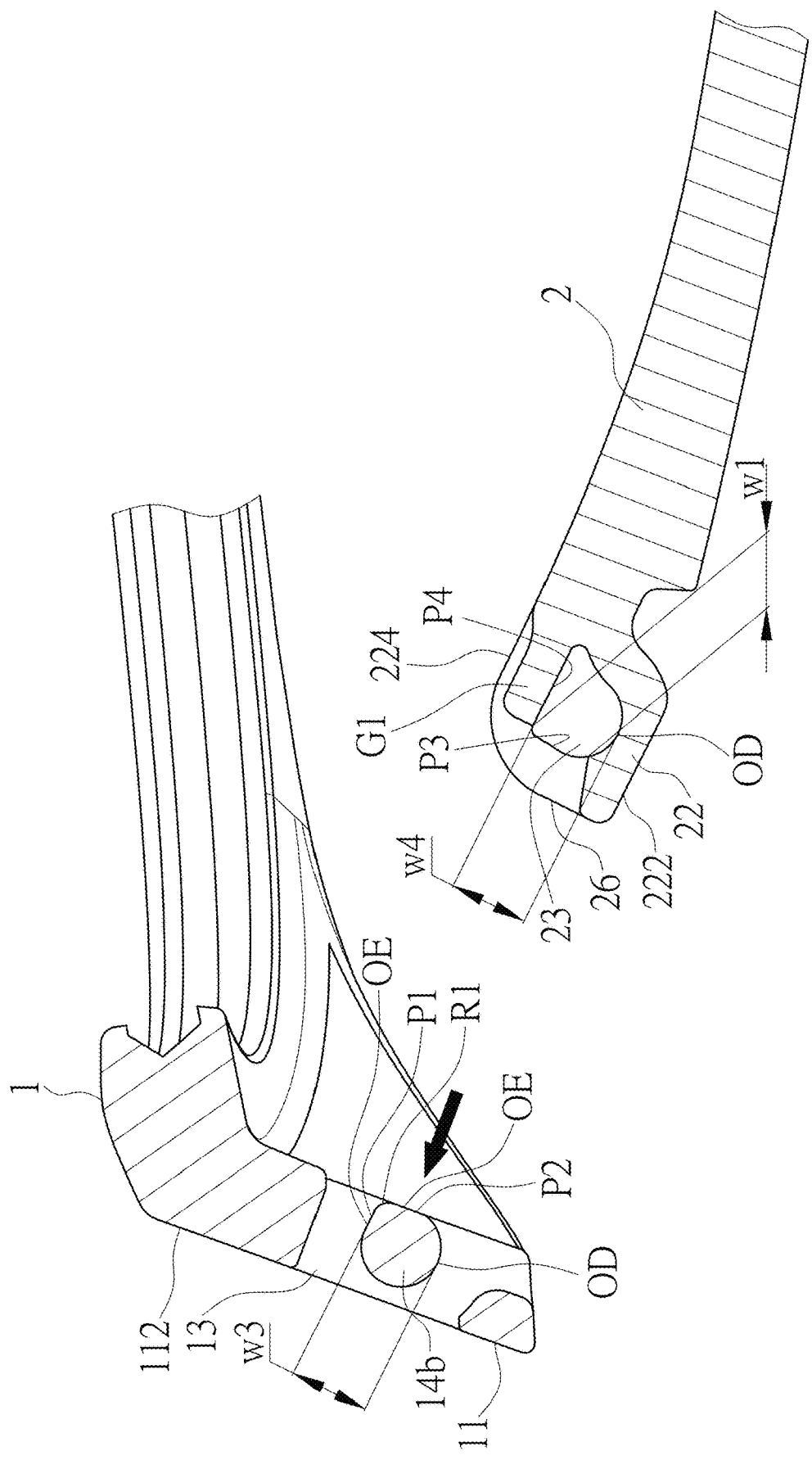
FIG. 12 and FIG. 13 are cross-sectional schematic diagrams showing the continuous operation of assembly in FIG. 10 according to the present disclosure.

Continue to refer to FIG. 8 and FIG. 9, which show the structural changes according to the embodiments of the present disclosure. Accordingly, the same structures will not be described again. In an embodiment, the pivot joint 14 is a column, and the two ends of the column are respectively connected to the top surface 131 and the bottom surface 132 of the window 13. A combination bracket 22 extends from the front end of the temple 2. A pivot hole 23 with an aperture 24 is penetrated through the combination bracket 22 from top to bottom. The aperture 24 is located on the front side 221 of the combination bracket 22. The temples 2 are detachably forced into the pivot joint 14 from the inside of the frame 1 by the aperture 24 such that the pivot joint 14 is embedded in the pivot hole 23 and can be pivoted to fold or unfold relative to the frame 1.

Continue to refer to FIG. 10 to FIG. 12 and FIG. 16, which show the structural changes according to anther embodiment of the present disclosure. Therefore, the same structures will not be described again. In an embodiment, a pivot part 14' is provided between the top surface 131 and the bottom surface 132 of the window 13 of the frame 1. The pivot part 14' includes two columns. The two columns extend from the top surface 131 and the bottom surface 132 of the window respectively, and the two columns are coaxially spaced and opposite to each other. The outer edge OE of each column 14*b* is provided with a first tangential surface P1 toward the front side of the frame 1, and the a second tangential surface P2 toward the inside of the frame 1. The second tangential surface P2 intersects with the first tangential surface P1, and the intersection forms an interference fillet R1. The front end of each column 14*b* is arc-shaped.

A stop part 26 is provided at the middle section of each aperture 24 of the combination bracket 22, and the aperture 24 is divided into an upper aperture 24*a* and a lower aperture 24*b*. The inner surface 224 of the combination bracket 22 is provided with two spaced apart notches 225. The two notches 225 are separated from the top surface 261 and the bottom surface 262 of the stop part 26 and penetrate the inner surface 224 of the combination bracket 22 such that the upper notch 225 connects the upper aperture 24*a* and the pivot hole 23, and the lower notch 225 connects the lower aperture 24*b* and the pivot hole 23. Accordingly, the inner surface 224 of the combination bracket 22 forms a structure an upper fork leg G1 and a lower fork leg G2, and the width w1 of the upper aperture 24*a* and the lower aperture 24*b* is smaller than the width w3 of the two columns 14*b* of the pivot joint 14'. In addition, the hole wall of the pivot hole 23 has a third tangential surface P3 and a fourth tangential surface P4. The third tangential surface P3 is adjacent to the stop part 26, and the fourth tangential surface P4 is adjacent to the inner surface 224 of the combination bracket 22. Moreover, the width w3 between the outer diameter OD of each column 14*b* and the first tangential surface P1 is slightly greater than the width w4 between the outer diameter OD of the pivot hole 23 and the fourth tangential surface P4. Further, the top surface 261 and the bottom surface 262 of the stop part 26 respectively form an inclined surface with a tapering angle from the front side 221 of the combination bracket 22 toward the pivot hole 23 such that the thickness t3 of the stop part 26 toward the front side 221 of the combination bracket 22 is greater than the thickness t4 of the stop part 26 toward the pivot hole 23.

Continue to refer to FIG. 11, FIG. 12, FIG. 13, FIG. 16 and FIG. 17, when each of the temples 2 is to be assembled to the frame 1, the temples 2 includes the upper aperture 24a and the lower aperture 24b and are elastically forced into the two columns 14b of the pivot joint 14' from the inside of the frame 1 such that the two columns 14b are embedded in the pivot hole 23. Additionally, the stop part 26 is an inclined surface with a tapering angle. When the front end of the stop part 26 is inserted into the space between the two columns 14b of the pivot joint 14, the two columns 14b will elastically deform along with the top surface 261 and bottom surface 262 of the stop part 26, see FIG. 17 for details. When the two columns 14b are inserted into the upper pivot hole 23, the thickness of the stop part 26 is greater than the height of the space between the two columns 14b such that the two columns 14b bring about a blocking effect and each of the temples 2 cannot be easily separated from the pivot hole 23.

Figure 13:
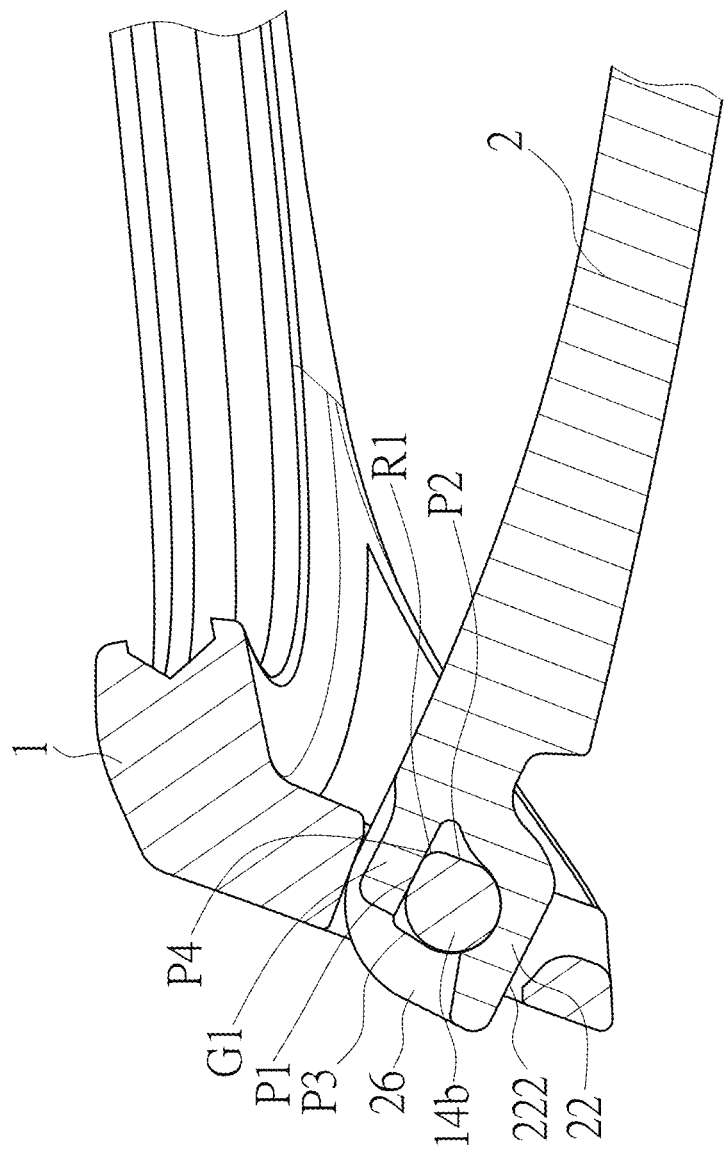

As mentioned above, each of the temples 2 is in a folded state after assembly. As shown in FIG. 13, the upper fork leg G1 and the lower fork leg G2 clamp the columns 14b in the pivot holes 23, respectively. That is, the fourth tangential surface P4 is in a state of being attached to the first tangential surface P1 such that each of the temples 2 is fixed after being folded, and there is no problem of swinging.

Figure 14:
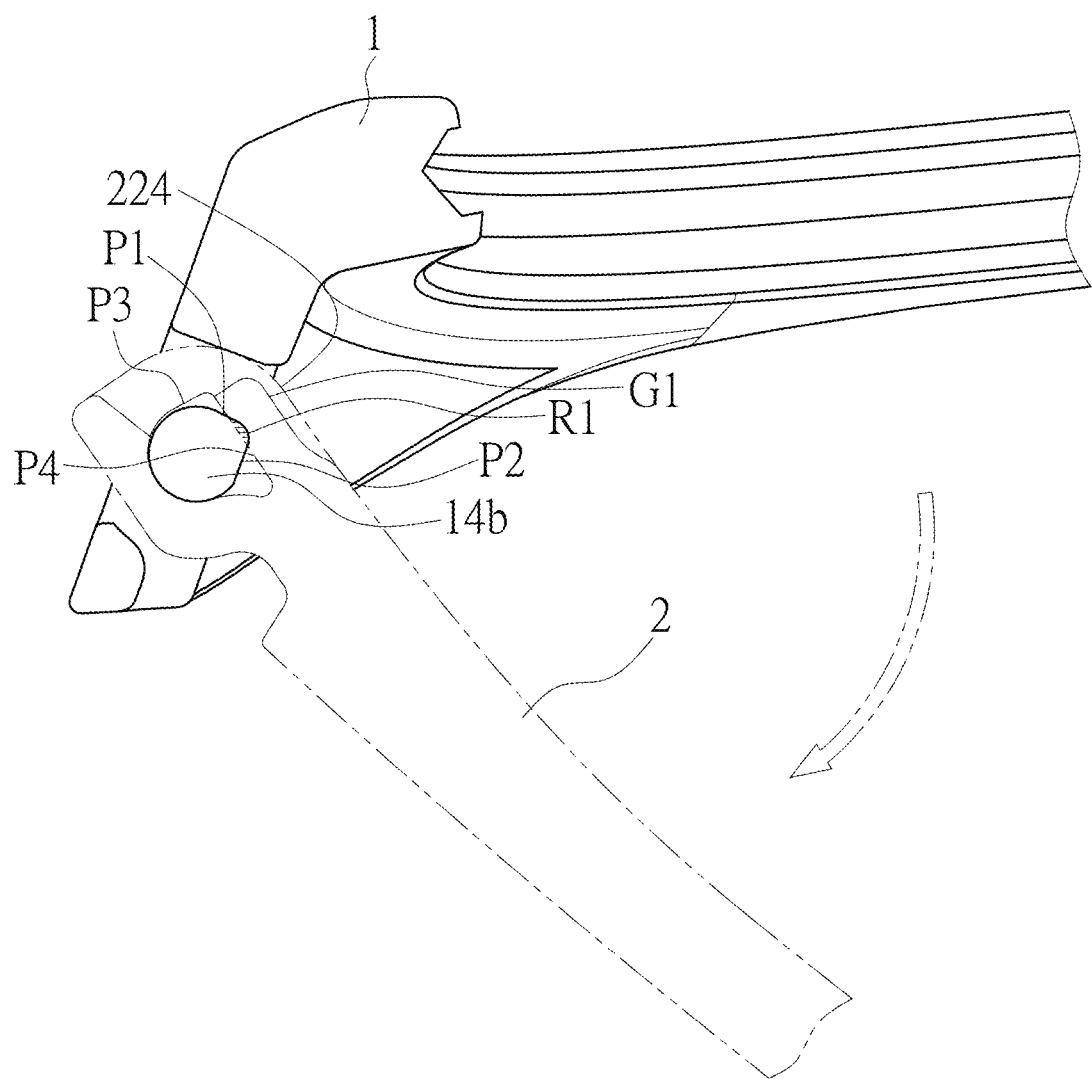
FIG. 14 and FIG. 15 are schematic diagrams showing the continuous operation of the temples unfolded in FIG. 10 according to the present disclosure.
Figure 15:
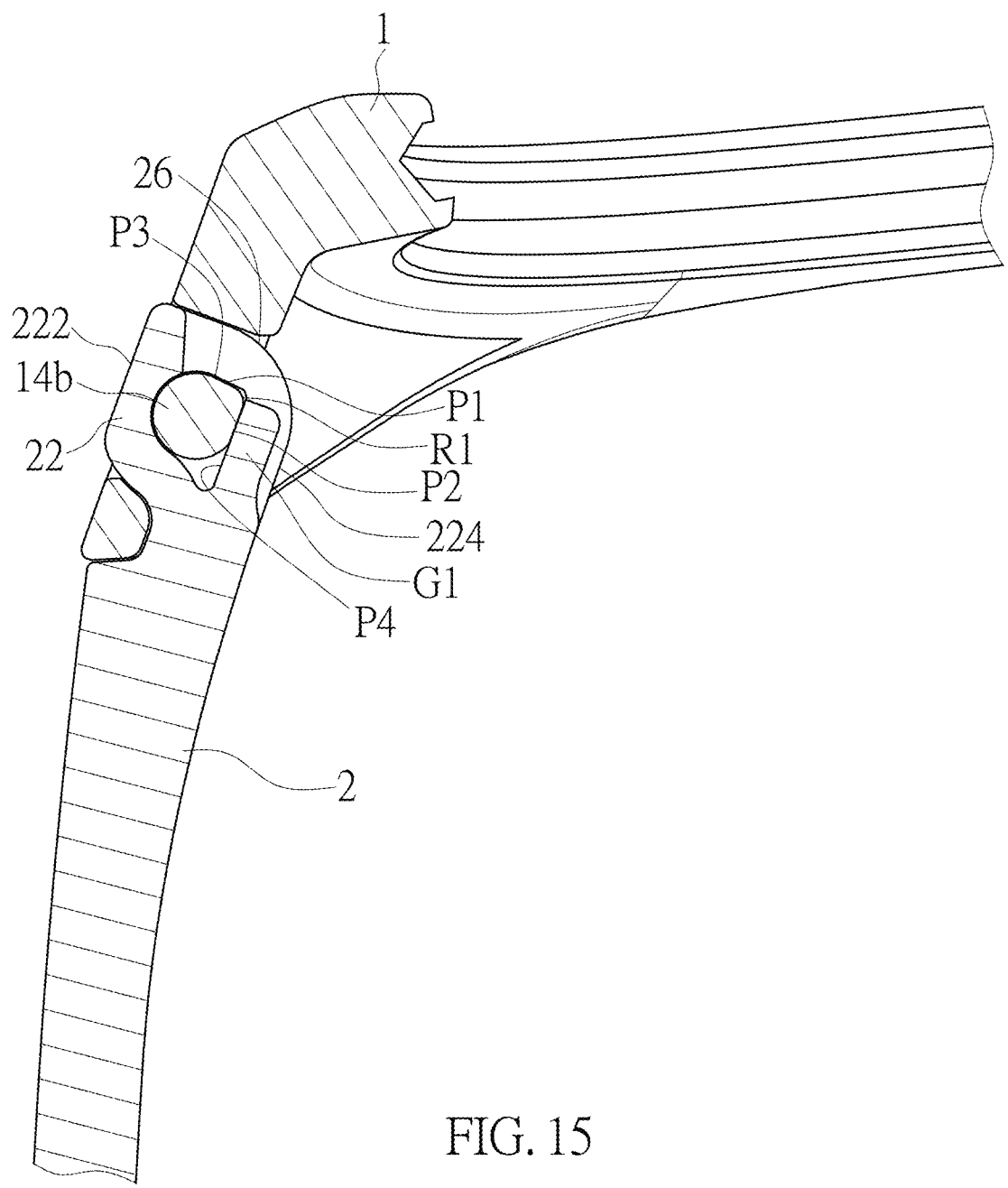
Figure 16:
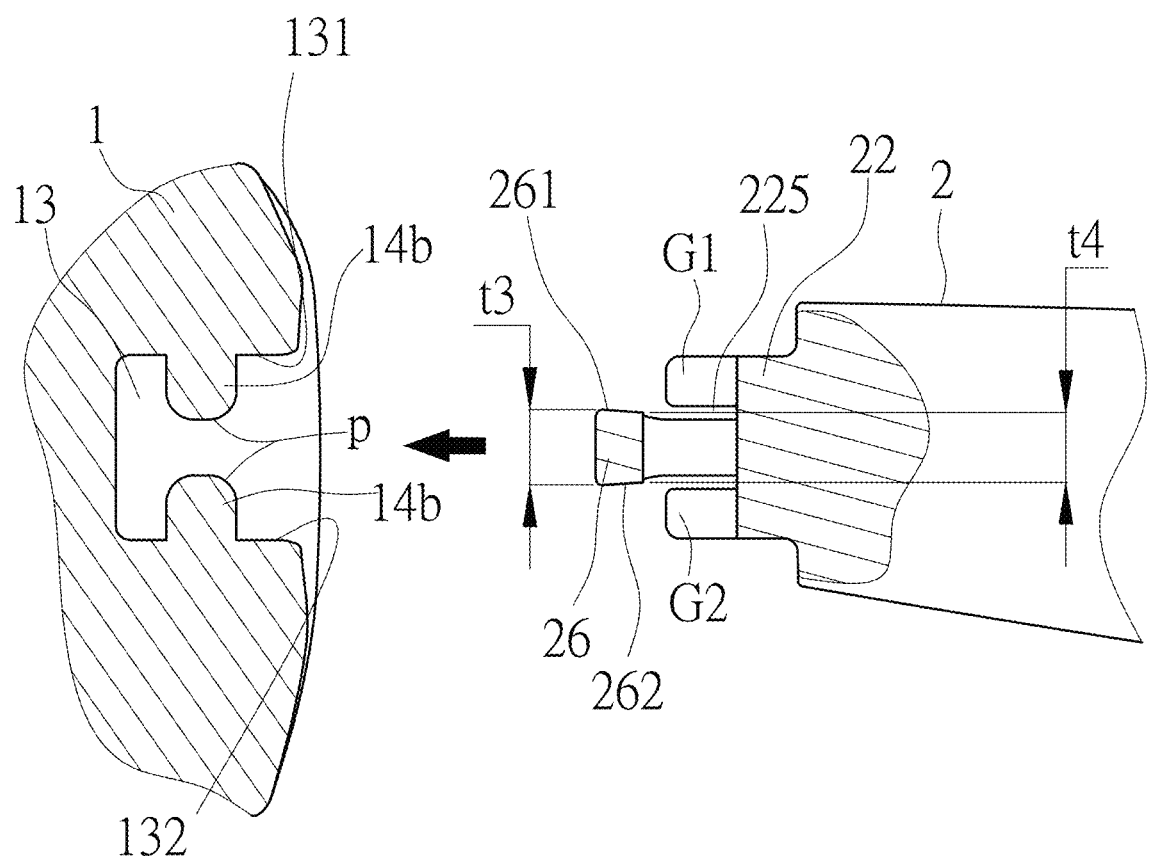
FIG. 16 and FIG. 17 are longitudinal-sectional schematic diagrams showing the continuous operation of assembly in FIG. 10 according the present disclosure.
Figure 17:
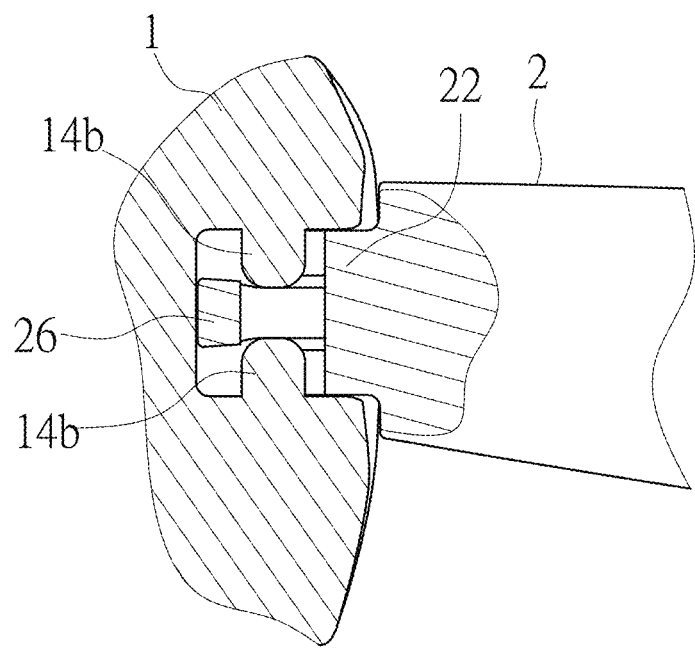

Continue to refer to FIG. 14 and FIG. 15, when each of the temples is unfolded, each upper fork leg G1 and each lower fork leg G2 form an interference pivot with each interference fillet R1 due to the elasticity of their material, as shown in FIG. 14 (the area drawn with diagonal lines represents the interference). The upper fork leg G1 and the lower fork leg G2 will elastically deform when they pivot to the interference fillet R1. As the temples 2 pivot to fully unfold, the first tangential surface P1 and the third tangential surface P3 are opposed or attached, and the second tangential surface P2 and the fourth tangential surface P4 are opposed or attached such that the temples 2 are fixed after unfolding, and there is no problem of random swinging.

To sum up, the frame and the temples of the present disclosure do not need to be locked with screws during the assembly process. In addition, during the disassembly process, the frame and the temples can be easily separated without the use of tools. The convenience of structural disassembly can also reduce the factory-side manufacturing process, shorten the production cycle, and make it more convenient. Besides, different materials or colors can be used according to usage needs or styling, thereby helping increase product diversity.

However, the above-mentioned embodiments are only illustrative to illustrate the effects of the present disclosure, and are not intended to limit the present disclosure. Those skilled in the art can make modifications and changes to the aforesaid embodiments without departing from the spirit and scope of the present disclosure. In addition, the numbers of elements in the above-mentioned embodiments are only for illustrative purposes, and are not intended to limit the present disclosure. Therefore, the scope of protection of rights of the present disclosure should be listed in the claims of the present disclosure below.

What is claimed is:

1. A detachable hinge, comprising:
   a frame, having a pivot base on each side and a window passing through an inner side and an outer side of the pivot base, wherein a pivot joint is provided between a top surface and a bottom surface of the window; and
   two temples, wherein two ends of each temple are respectively provided with an ear hook part and a combination bracket, the combination bracket is provided with a pivot hole running from top to bottom, the pivot hole has an aperture, the aperture has a width that is smaller than a width of the pivot joint, and the pivot joint is embedded in the pivot hole, thereby pivoting relative to the frame,
   wherein the pivot joint comprises two columns, one column extends from the top surface of the window, another column extends from the bottom surface of the window, and the two columns are coaxially spaced and opposite to each other,
   wherein an outer edge of each column is provided with a first tangential surface and a second tangential surface, the second tangential surface intersects with the first tangential surface, and the intersection forms an interference fillet,
   wherein a top surface and a bottom surface of the stop part respectively form slopes with tapering angles from a front side of the combination bracket toward the pivot hole such that a thickness of the stop part toward the front side of the combination bracket is greater than a thickness of the stop part toward the pivot hole.

2. The detachable hinge of claim 1, wherein the stop part is provided in the middle section of the aperture to separate the aperture into an upper aperture and a lower aperture, the inner side of each combination bracket is provided with two spaced notches, the two notches are separated from the top surface and the bottom surface of the stop part and are communicated with the upper aperture and the lower aperture and the pivot hole respectively such that an upper fork leg and a lower fork leg are provided on an inner surface of the combination bracket, two columns are forced into the pivot hole by the upper aperture and the lower aperture, a hole wall of each pivot hole is provided with a third tangential surface corresponding to the first tangential surface and a fourth tangential surface corresponding to the second tangential surface.

3. The detachable hinge of claim 2, wherein a width between an outer diameter of each column and the first tangential surface is slightly larger than a width between an outer diameter of the pivot hole and the fourth tangential surface, when each of the temples is unfolded, the first tangential surface faces the third tangential surface, and the second tangential surface faces the fourth tangential surface, and when each of the temples is folded, the upper fork leg and the lower fork leg use material elasticity to provide interference pivoting with the interference fillet, and after being folded, the upper fork leg and the lower fork leg are clamped on the outer edge of each column.

4. The detachable hinge of claim 2, wherein the first tangential surface faces the front side of the frame, the second tangential surface faces an inside of the frame, the third tangential surface is adjacent to the stop art, and the fourth tangential surface is adjacent to the inner side of the combination bracket.

* * * * *